US011945251B2

(12) United States Patent
Francoeur et al.

(10) Patent No.: US 11,945,251 B2
(45) Date of Patent: *Apr. 2, 2024

(54) DIRECT THERMAL AND THERMAL TRANSFER LABEL COMBINATION

(71) Applicant: Iconex LLC, Duluth, GA (US)

(72) Inventors: Roger Francoeur, Bennington, NE (US); Timothy Darren Livingston, Corryton, TN (US)

(73) Assignee: Iconex LLC, Duluth, GA (US)

( * ) Notice: Subject to any disclaimer, the term of this patent is extended or adjusted under 35 U.S.C. 154(b) by 303 days.

This patent is subject to a terminal disclaimer.

(21) Appl. No.: 17/240,825

(22) Filed: Apr. 26, 2021

(65) Prior Publication Data

US 2021/0245539 A1 Aug. 12, 2021

Related U.S. Application Data

(63) Continuation of application No. 15/876,277, filed on Jan. 22, 2018, now Pat. No. 11,090,967.

(51) Int. Cl.
*B41M 5/52* (2006.01)
*B41J 2/32* (2006.01)
(Continued)

(52) U.S. Cl.
CPC ................. *B41M 5/42* (2013.01); *B41J 2/32* (2013.01); *B41J 2/325* (2013.01); *B41M 5/52* (2013.01);
(Continued)

(58) Field of Classification Search
CPC ........ B41M 5/42; B41M 5/52; B41M 5/5245; B41M 2205/02; B41M 2205/04;
(Continued)

(56) References Cited

U.S. PATENT DOCUMENTS 3,539,378 A 11/1970 Shephard et al.
4,839,224 A 6/1989 Chou et al.
(Continued)

FOREIGN PATENT DOCUMENTS

JP H0725148 A 1/1995

OTHER PUBLICATIONS

"U.S. Appl. No. 15/876,277, Advisory Action dated Mar. 12, 2020", 5 pgs.
(Continued)

*Primary Examiner* — Gerard Higgins
(74) *Attorney, Agent, or Firm* — Schwegman Lundberg & Woessner, P.A.

(57) ABSTRACT

A direct thermal and thermal transfer label combination is provided. The label includes a substrate, and the substrate includes a thermal print coating applied to a front side of the substrate. The label also includes a liner attached to a backside of the substrate along a first side of the liner. Further, an aqueous resin-based thermal transfer coating is applied to a second side of the liner. The front side of the label is capable of being imaged through direct thermal printing while the second side of the liner represents an opposite side of the label that is capable of being imaged through thermal transfer printing.

18 Claims, 5 Drawing Sheets

(51) Int. Cl.

| | |
|---|---|
| ***B41J 2/325*** | (2006.01) |
| ***B41M 5/42*** | (2006.01) |
| ***G09F 3/00*** | (2006.01) |
| ***G09F 3/02*** | (2006.01) |
| *B41J 3/407* | (2006.01) |
| *G09F 3/04* | (2006.01) |

(52) U.S. Cl.
CPC .......... *G09F 3/0291* (2013.01); *B41J 3/4075* (2013.01); *B41M 2205/02* (2013.01); *B41M 2205/04* (2013.01); *B41M 2205/32* (2013.01); *B41M 2205/38* (2013.01); *B41M 2205/42* (2013.01); *G09F 2003/0211* (2013.01); *G09F 2003/0229* (2013.01); *G09F 3/0297* (2013.01); *G09F 3/04* (2013.01)

(58) Field of Classification Search
CPC .......... B41M 2205/32; B41M 2205/38; B41M 2205/42; G09F 3/0291; G09F 3/0297; G09F 3/04; G09F 2003/0211; G09F 2003/0229
See application file for complete search history.

(56) References Cited

U.S. PATENT DOCUMENTS

| | | | |
|---|---|---|---|
| 5,242,888 | A | 9/1993 | Atherton et al. |
| 5,248,652 | A | 9/1993 | Talvalkar |
| 5,276,002 | A | 1/1994 | Okumura et al. |
| 5,284,816 | A | 2/1994 | Stephenson |
| 5,449,201 | A | 9/1995 | Miller et al. |
| 5,580,640 | A | 12/1996 | Kraft et al. |
| 5,958,536 | A | 9/1999 | Gelsinger et al. |
| 5,977,227 | A | 11/1999 | Mccreight |
| 6,027,850 | A | 2/2000 | Kawakami et al. |
| 6,254,138 | B1 | 7/2001 | Rawlings et al. |
| 8,043,993 | B2 | 10/2011 | Roth et al. |
| 8,568,847 | B2 | 10/2013 | Brookshire et al. |
| 11,090,967 | B2 * | 8/2021 | Francoeur ................ B41M 5/52 |
| 2004/0195824 | A1 | 10/2004 | Blank |
| 2009/0015649 | A1 | 1/2009 | Keeton et al. |
| 2009/0110865 | A1 | 4/2009 | Mckillip |
| 2012/0234481 | A1 | 9/2012 | Raming |
| 2013/0068380 | A1 | 3/2013 | Brookshire et al. |
| 2016/0086520 | A1 | 3/2016 | Vigunas et al. |
| 2017/0021974 | A1 | 1/2017 | Lemmons et al. |
| 2017/0320333 | A1 | 11/2017 | Benton |
| 2018/0290416 | A1 | 10/2018 | Francoeur et al. |
| 2019/0224986 | A1 | 7/2019 | Francoeur et al. |

OTHER PUBLICATIONS

"U.S. Appl. No. 15/876,277, Advisory Action dated Nov. 10, 2020", 4 pgs.
"U.S. Appl. No. 15/876,277, Final Office Action dated Jan. 8, 2020", 12 pgs.
"U.S. Appl. No. 15/876,277, Final Office Action dated Sep. 2, 2020", 11 pgs.
"U.S. Appl. No. 15/876,277, Non Final Office Action dated Jan. 10, 2019", 5 pgs.
"U.S. Appl. No. 15/876,277, Non Final Office Action dated Apr. 29, 2020", 11 pgs.
"U.S. Appl. No. 15/876,277, Non Final Office Action dated Jul. 23, 2019", 12 pgs.
"U.S. Appl. No. 15/876,277, Non Final Office Action dated Dec. 18, 2020", 11 pgs.
"U.S. Appl. No. 15/876,277, Notice of Allowance dated Apr. 14, 2021", 9 pgs.
"U.S. Appl. No. 15/876,277, Response filed Mar. 4, 2020 to Final Office Action dated Jan. 8, 2020", 8 pgs.
"U.S. Appl. No. 15/876,277, Response filed Mar. 17, 2021 to Non Final Office Action dated Dec. 18, 2020", 9 pgs.
"U.S. Appl. No. 15/876,277, Response filed Mar. 31, 2020 to Advisory Action dated Mar. 12, 2020", 4 pgs.
"U.S. Appl. No. 15/876,277, Response filed Apr. 10, 2019 to Non Final Office Actio dated Jan. 10, 2019", 7 pgs.
"U.S. Appl. No. 15/876,277, Response filed Jul. 29, 2020 to Non Final Office Action dated Apr. 29, 2020", 8 pgs.
"U.S. Appl. No. 15/876,277, Response filed Oct. 23, 2019 to Non-Final Office Action dated Jul. 23, 2019", 9 pgs.
"U.S. Appl. No. 15/876,277, Response filed Nov. 2, 2020 to Final Office Action dated Sep. 2, 2020", 8 pgs.
"U.S. Appl. No. 16/203,084, Non Final Office Action dated Mar. 18, 2021", 17 pgs.
"U.S. Appl. No. 16/203,084, Response filed Dec. 29, 2020 to Restriction Requirement dated Dec. 18, 2020", 7 pgs.
"U.S. Appl. No. 16/203,084, Restriction Requirement dated Dec. 18, 2020", 7 pgs.
"European Application Serial No. 19741054.1, Extended European Search Report dated Mar. 5, 2021", 9 pgs.
"International Application Serial No. PCT/US2019/014530, International Preliminary Report on Patentability dated Aug. 6, 2020", 13 pgs.
"International Application Serial No. PCT/US2019/014530, International Search Report dated Jun. 10, 2019", 6 pgs.
"International Application Serial No. PCT/US2019/014530, Written Opinion dated Jun. 10, 2019", 11 pgs.
"Australian Application Serial No. 2019210321, First Examination Report dated Oct. 9, 2023", 3 pgs.

* cited by examiner

DIRECT THERMAL AND THERMAL TRANSFER LABEL COMBINATION

This application is a continuation of U.S. patent application Ser. No. 15/876,277, filed Jan. 22, 2018, which application is incorporated herein by reference in its entirety.

BACKGROUND

The ubiquitous label is available in a myriad of configurations for use in various applications, including specialty applications. A label can be imaged on a single side or both sides using inkjet printers, laser printers, and/or thermal printers.

Direct thermal imaging occurs when a thermal print head of a thermal printer applies heat to the surface of the label to selectively activate thermal ink coated on the surface of the label.

Thermal transfer imaging occurs when a thermal ribbon of a thermal printer transfers/melts ink onto the surface of the label for selectively imaging the label.

A label can be imaged on one side or both sides using thermal imaging techniques. Typically, a label imaged on both sides either utilizes direct thermal printing on both sides of the label or utilizes thermal transfer printing on both sides of the label.

Thermal papers that are thermally coated on both sides are more expensive than thermal paper that is just thermally coated on one side. Moreover, thermal printers having dual opposing thermal print heads, which are capable of direct thermal imaging on both sides of dual-thermally-coated paper, are expensive.

Furthermore, several problems can arise when attempting to perform dual-sided imaging of a label. For instance, when one side of the label is being imaged by a first thermal print head, the applied heat may partially activate the thermal coating on the opposite side of the label.

With thermal transfer approaches, the thermally transferred/melted ink to one or both sides of a label can smear or bleed through to an opposing side of the label. Smearing is especially problematic when one side of the paper is utilizing direct thermal and the other side of the paper is utilizing thermal transfer because of the heat applied by the smearing occurs when the environment is hot and humid and the thermal transfer print is rubbed by operators handling the label. Further, direct thermal prevents the melted ink from the thermal transfer to properly cure, making smearing likely in such applications.

SUMMARY

In various embodiments, a direct thermal and thermal transfer label combination, roll/fanfold, and method of producing the same are provided.

According to an embodiment, a combination label is provided. The label includes a substrate, and the substrate includes a thermal print coating applied to a front side of the substrate. The label also includes a liner attached to a backside of the substrate along a first side of the liner. Furthermore, the label includes an aqueous resin-based thermal transfer coating applied to a second side of the liner. In an embodiment, the aqueous resin-based thermal transfer coating is applied in a specific Billions of Cubic Microns (BCM) quantity.

DETAILED DESCRIPTION

As will be described more completely herein and below, a direct thermal and thermal transfer label are presented.

The term "channel" is a die cut portion of a substrate defined by a weakened periphery that outlines the portion (perforation).

Figure 1:
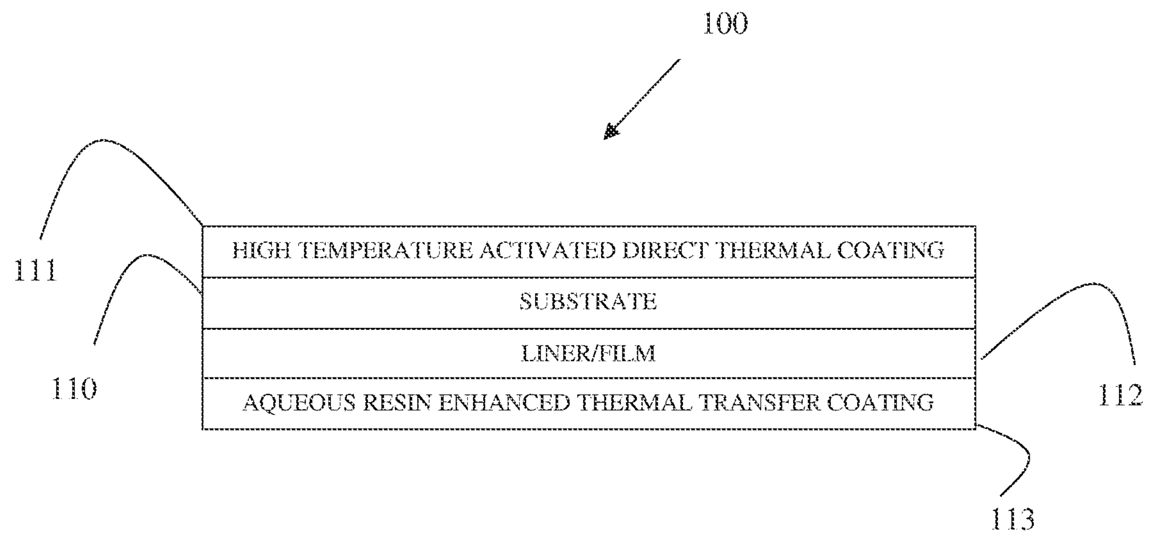
FIG. 1 is a diagram of a direct thermal and thermal transfer label is provided, according to an example embodiment.

FIG. 1 is a diagram of a direct thermal and thermal transfer label 100 is provided, according to an example embodiment. It is noted that the dimensions of the substrate 110 and the liner/film 112 can vary in various embodiments presented herein and below.

The label 100 includes a substrate (face stock, etc.). The substrate 110 includes a front side that includes a high-temperature activated direct thermal coating 111 (hereinafter just "thermal print coating 111"). The backside of the substrate 110 is affixed to a first side of a liner 112 (film, translucent-based material). The second side of the liner 112 includes an aqueous resin enhanced thermal transfer coating 113 (herein after just "aqueous resin-based thermal transfer coating 113).

In an embodiment, the thermal print coating 111 includes a coating where the thermal ink of the coating is not activated until at least 212 degrees Fahrenheit.

In an embodiment, the thermal print coating 111 includes a coating where the thermal ink of the coating is not activated until at least 220 degrees Fahrenheit. In an embodiment, the thermal print coating 111 includes a thermal ink of the coating that activates based on the application between approximately 158 to 220 degrees Fahrenheit/

In an embodiment, the thermal print coating 111 is prefabricated on the label 100 whereas the aqueous resin-based thermal transfer coating 113 is post-manufacture of the label 100 applied to the second side of the label 100.

In an embodiment, the substrate 110 and the thermal print coating 111 is a pharmaceutical grade thermal print stock.

The liner 112 is a translucent and soft material until the aqueous resin-based thermal transfer coating 113 is applied at which point the liner 112 becomes more opaque and harder and conducive for thermal transfer printing by a thermal transfer print head (ribbon).

In an embodiment, the aqueous resin-based thermal transfer coating 113 includes a resin dissolved in an alkaline solution so as to raise the alkalinity of the aqueous resin-based thermal transfer coating 113 above a pH of 7.0. In an embodiment, the alkaline solution is ammonia. In an embodiment, the aqueous resin-based thermal transfer coating 113 includes a pH that is equal to or greater than a pH associated with ammonia.

In an embodiment, the aqueous resin-based thermal transfer coating 113 includes a low wax content. That is, the wax content of the aqueous resin-based thermal transfer coating 113 is less than what would be found in existing thermal transfer coatings.

In an embodiment, the aqueous resin-based thermal transfer coating 113 is specialized or customized for performance to a thermal transfer ribbon of a thermal printer.

When the aqueous resin-based thermal transfer coating 113 is applied to the second side of the liner 112, the liner 112 is calendared, smoothed, and hardened, such that the liner 112 is capable of being printed on by a thermal transfer ribbon of a thermal printer (the ribbon bites onto the surface of second side of the liner 112 for quality thermal transfer printing). That is, prior to the coating 113 being applied to the liner 112 is incapable of being imaged by a thermal transfer technique without significant smearing and/or smudging. After, the coating 113 is applied to the liner 112, the liner 112 becomes thermal-transfer capable and can be imaged with substantially less or without any smearing or smudging.

In an embodiment, prior to coating 113 the second side of the liner 112, the liner 112 was incapable of having barcodes or Quick Response (QR) imaged with a quality that could be read from a scanner (particularly by lower quality scanners). However, after the coating 113 is applied to the second side of the liner 112, barcodes and QR codes can be imaged on the liner 112 and read by scanners without any problems.

The aqueous resin-based thermal transfer coating 113 provides image quality on the liner 112 as a backside of the label 100 (the front side of the label 100 having high-temperature direct thermal image quality from the thermal print coating 111). This permits dual sided imaging on the label 100 that: prevents the coating 111 from activating when the label 100 is processed through a heat tunnel and that prevents smearing and smudging of the print images when printed on the second side of the liner 112 (through the novel coating 113).

Figure 2:
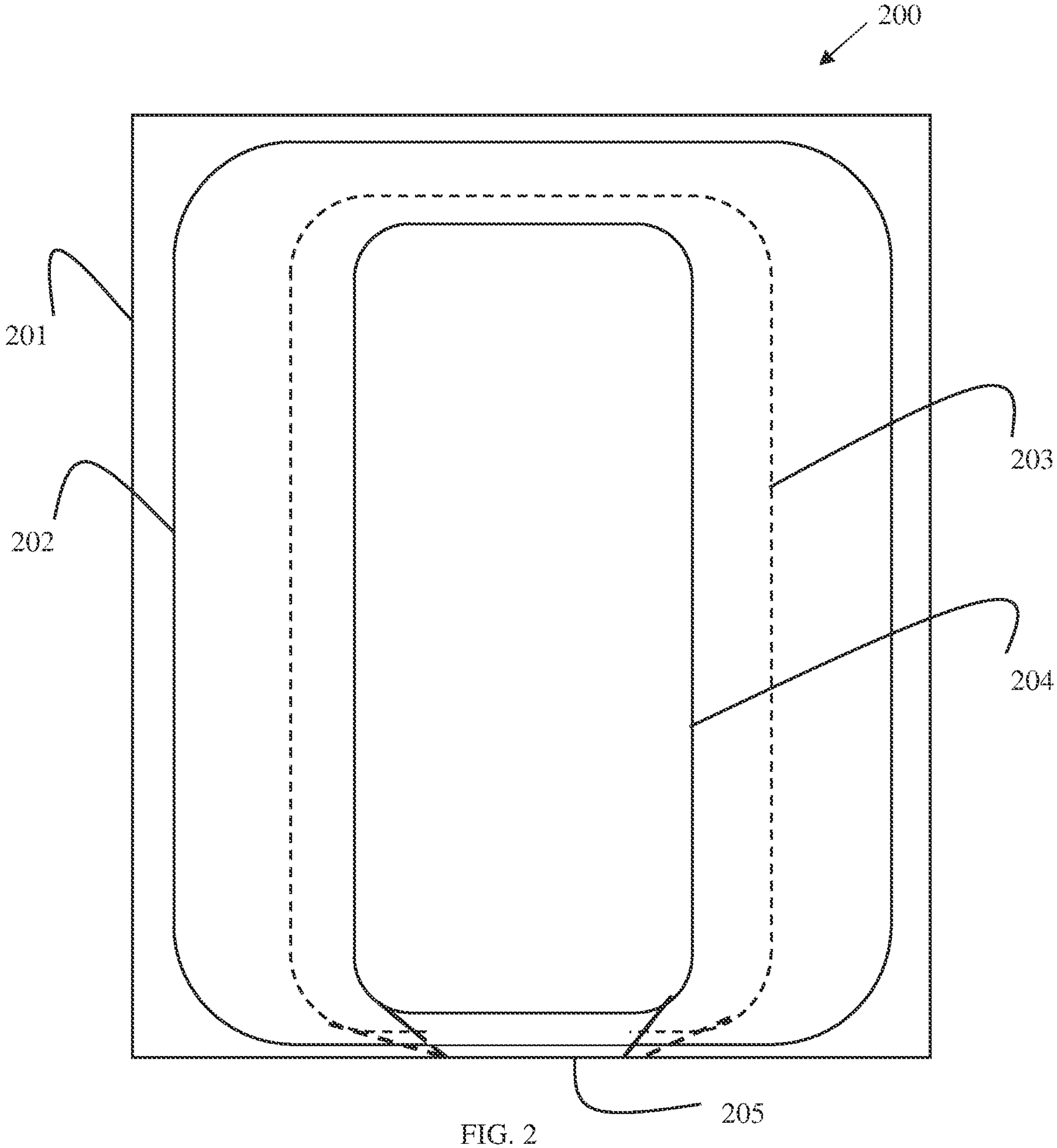
FIG. 2 is a diagram of an example direct thermal and thermal transfer label, according to an example embodiment.

FIG. 2 is a diagram of an example direct thermal and thermal transfer label 200, according to an example embodiment.

The label 200 includes a liner 201, a front side (face) 202 of the label 200, a perforation 203, and back cut 204, and a separation tab 205.

In an embodiment, the liner 201 is 6 inches by 12 inches; the front side or label shape is 5.875 includes by 11.875 inches, the perforation 203 is 4.25 inches by 11.1875 includes, and the back cut is 4 inches by 11.0875 inches.

The backside of the label 200 is the second side of the liner 201 and is coated with the aqueous resin-based thermal transfer coating 113. The front side 202 of the label 200 include the high-temperature activated thermal print coating 111.

The perforation 203 converges to the tab 204. When the tab 204 is pulled up, the label 200 is separated into two portions. The removed portion includes imaged information that was imaged by direct thermal transfer printing on its front side (the front side of substrate 100) whereas the backside of the separated portion of the label 200 includes imaged information that was imaged by thermal transfer printing directly on the second side of the liner 201.

When the label 200 is applied to packaging material or a product (through adhesive coating on at least a portion (outlined area that does not include the area occupied by the perforation 203)), the tab 205 can be lifted to remove the back cut portion 204 with stability and integrity of back cut portion 204 remaining because the tab 205 is situated at the center bottom of the label 200. The non-back cut portion (area that does not include the area of the back cut portion 204) stably remains affixed to the packaging material or the product. When the back cut portion 204 is flipped, the second side of the liner 201 reveal printed information performed through thermal transfer printing on the coating 113. The location of the tab 205 permits stable zip removal of the back cut portion 204.

Figure 3:
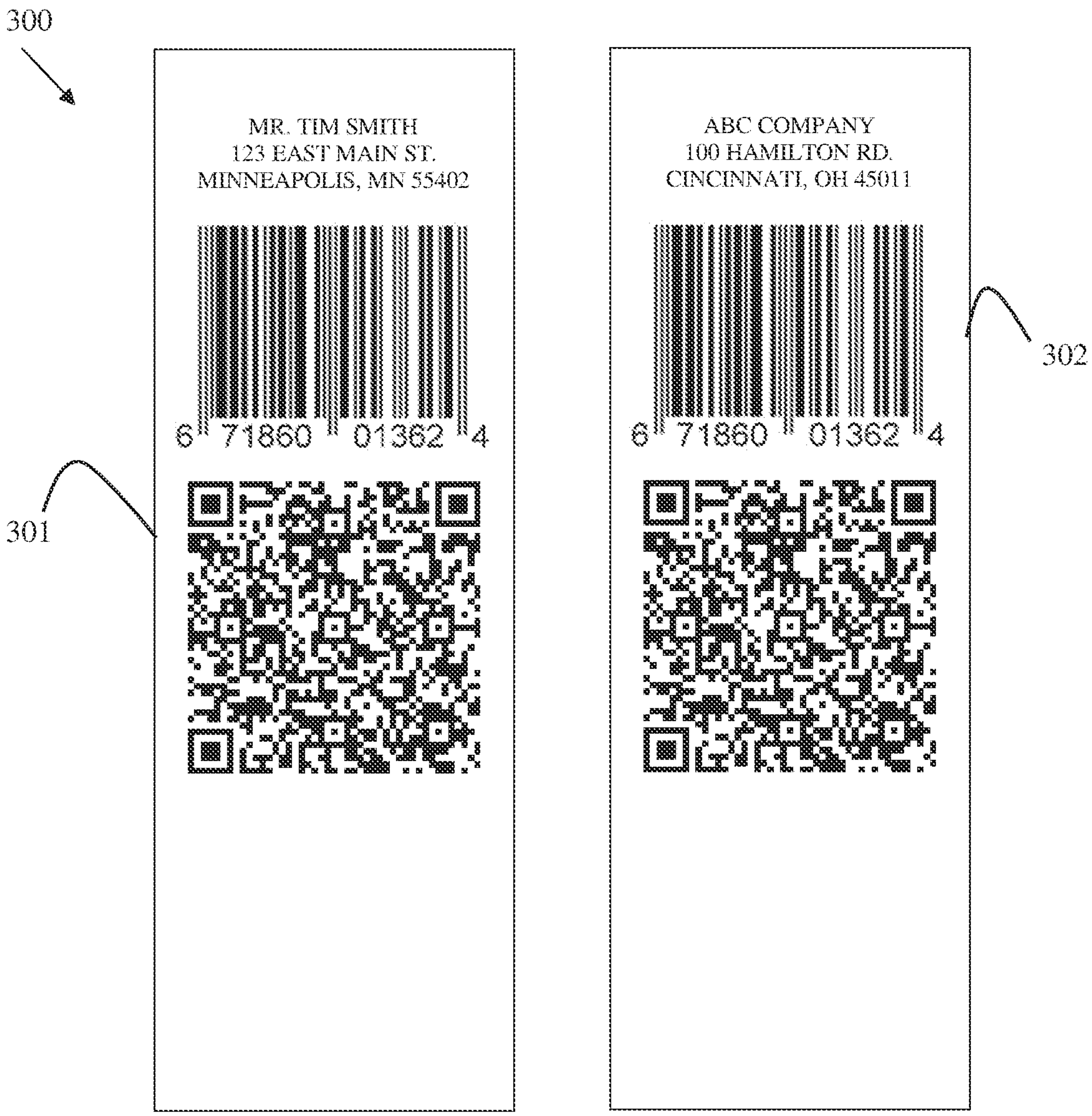
FIG. 3 is a diagram depicting imaged front and back sides of a direct thermal and thermal transfer label, according to an example embodiment.

FIG. 3 is a diagram depicting imaged front and back sides of a direct thermal and thermal transfer label 300, according to an example embodiment.

The front side 301 depicts printed image elements that were imaged through high-temperature direct thermal transfer printing by applying heat in excess of 212 degrees Fahrenheit or in excess of 220 degrees Fahrenheit to the coating 111 on the substrate 100. Quality barcodes and/or QR codes can be imaged on the front side.

The back side 302 depicts printed image elements that were imaged through thermal transfer printing by a thermal print head ribbon onto the surface of the second side of the liner 112. The resulting print quality permits image elements for barcodes and OR codes.

The front side 301 depicts an address label with a barcode and a OR code imaged by direct thermal printing. The back side 302 depicts a return address label with a barcode and a OR code imaged by thermal transfer printing.

It is noted that the printed image elements and information depicted in the FIG. 3 is presented for purposes of illustration only as any desired image elements can be imaged on the front side 301 and the back side 302. For example, the back side 302 can be receipt, a shipping list, etc.

Figure 4:
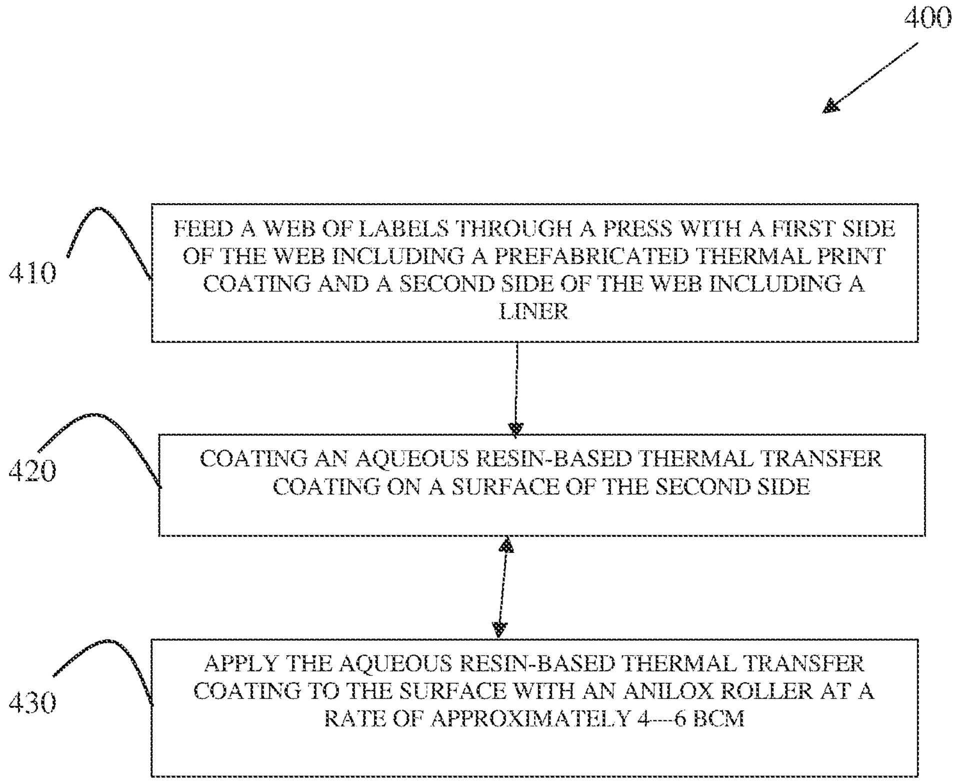
FIG. 4 is a diagram of a method for producing a direct thermal and thermal transfer label, according to an example embodiment.

FIG. 4 is a diagram of a method 400 for producing a direct thermal and thermal transfer label, according to an example embodiment.

The method 400 is implemented on a printing press and is processed by a printing press configured to perform the processing depicted.

At 410, a web of labels on a label roll are fed into the press. The first side of the web includes a prefabricated thermal print coating, such as the high-temperature activated coating 111. The second side of the web includes a liner 112.

At 420, the press coats an aqueous resin-based thermal transfer coating on a surface of the second side of the web. The aqueous resin-based thermal transfer coating is the coating 113.

In an embodiment, at 430, the press applies the aqueous resin-based thermal transfer coating to the surface of the second side with at least one anilox roller at a rate of approximately 4-6 Billions of Cubic Microns (BCM).

Figure 5:
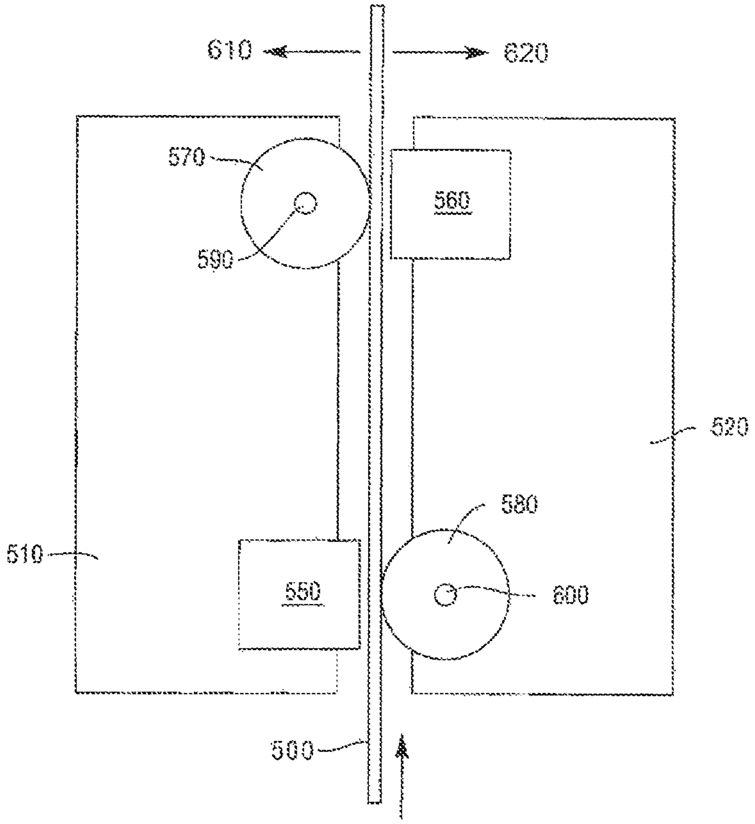
FIG. 5 is a diagram of a thermal printer, according to an example embodiment.

FIG. 5 is a diagram of a thermal printer, according to an example embodiment. The thermal printer includes opposing thermal print heads 550 and 560. At least one print head 550 or 560 is a direct thermal print head with the remaining print head 550 or 560 being a thermal transfer print head with thermal ribbon.

A label 500 (such as labels 100, 200, and 300) is fed through the printer in the direction of the arrow encountering a first print head 550 and an opposing first platen 580 and shaft 600. The first print head 550 comprising a first print head assembly 510 that includes the print head 550 and second platen 570 and second shaft 590. The second print head 560 includes a second print head assembly 520 that include the print head 560 and the first platen 580 and shaft 600.

The arrows 610 and 620 indicate that the label 500 is imaged through direct thermal printing on one side and thermal transfer printing on a second side of the label 500 within the printer.

During operation of the double-sided thermal printer (direct thermal and thermal transfer), the motor drives the first and second shafts 590 and 600 to turn the first and second platens 570 and 580. Accordingly, when a label 500 is fed into the printer, rotation of the first and second platens 570 and 580 pushes the label 500 in a direction indicated by a vertical arrow. As the label 500 passes through the printer, the first and second print heads 550 and selectively heat the one side of label 500 to perform printing operations for direct thermal printing (indicated by arrow 610) and selectively transfers ink from a thermal ribbon onto a second side of the label 500 (indicated by arrow 620) for thermal transfer printing. More particularly, first print head 550 performs direct thermal printing operations on a side of label 500 indicated by an arrow 610 and second print head 560 performs thermal transfer printing operations a side of label 500 indicated by an arrow 620.

Although the present invention has been described with particular reference to certain preferred embodiments thereof, variations and modifications of the present invention can be effected within the spirit and scope of the following claims.

The invention claimed is:

1. A label, comprising:

a substrate having a thermal print coating applied to a frontside of the substrate;

a liner having a first side and a second side, wherein the first side is affixed to a backside of the substrate and the second side having an aqueous resin-based thermal transfer receptive coating; and the aqueous resin-based thermal transfer receptive coating is formed using a resin dissolved in ammonia and using an alkaline mixture that includes a wax;

wherein the thermal print coating enables direct thermal imaging on the frontside of the substrate;

wherein the aqueous resin-based thermal transfer receptive coating enables thermal transfer printing on the second side of the liner.

2. The label of claim 1, wherein the liner becomes more opaque and less translucent with the aqueous resin-based thermal transfer receptive coating.

3. The label of claim 2, wherein the liner becomes harder and conducive for thermal transfer printing by a thermal transfer print ribbon applied to the aqueous resin-based thermal transfer receptive coating.

4. The label of claim 3, wherein the aqueous resin-based thermal transfer receptive coating is calendared, hardened, and smoothed on the second side of the liner.

5. The label of claim 1, wherein the liner is a film that is translucent before the aqueous resin-based thermal transfer receptive coating is coated on the second side of the liner.

6. The label of claim 1, wherein the thermal print coating activates for direct thermal imaging at an applied heat in excess of approximately 212 degrees Fahrenheit.

7. The label of claim 1 further comprising:

a perforation through the substrate and through a liner portion of the liner that defines a removable liner-label combination to permit a first portion of the substrate to be removed from remaining portions of the substrate and the liner portion of the liner attached thereto.

8. The label of claim 1, wherein a pH of the resin-dissolved in ammonia is greater than 7.0.

9. The label of claim 8, wherein the pH of the resin dissolved in ammonia is greater than a pH of ammonia.

10. The label of claim 1, wherein the second side of the liner with the aqueous resin-based thermal transfer receptive coating can be imaged with Quick Response (QR) codes by thermal transfer printing.

11. The label of claim 1, wherein the label is enabled for dual sided imaging by direct thermal imaging the thermal print coating and by the thermal transfer printing the aqueous resin-based thermal transfer receptive coating with indicia imaged on the frotrtside of the substrate and second indicia imaged on the second side of the liner and without any smearing and smudging.

12. A label, comprising:

a substrate with a removable label defined in a first portion of the substrate via a perforation die cut within the substrate;

a thermal print coating for direct thermal printing on a frotrtside of the first portion of the substrate;

a liner having a first side and a second side, the first side is affixed to a backside of the substrate, the second side having an aqueous resin-based thermal transfer receptive coating applied thereto, and a liner portion of the liner that corresponds with and aligns to the first portion of the substrate and the perforation die cut, the perforation die cut extends through the liner to define the liner portion;

the aqueous resin-based thermal transfer receptive coating enables thermal transfer printing on the second side of the liner, wherein the aqueous resin-based thermal transfer receptive coating having a resin dissolved in ammonia and is an alkaline mixture that includes a wax;

wherein the first portion of the substrate and the liner portion of the liner are enabled to be removed from remaining portions of the substrate and the liner as a removable label-liner combination with first indicia imaged on a corresponding frontside of the substrate by direct thermal printing and with second indicia imaged on a corresponding second side of the liner portion of the liner by thermal transfer printing.

13. The label of claim 12, wherein the aqueous resin-based thermal transfer receptive coating is calendared, hardened, and smoothed on the second side of the liner portion of the liner.

14. The label-liner combination of claim 12, wherein the pH of the resin dissolved in ammonia is greater than a pH of ammonia.

15. The label of claim 12, wherein the thermal print coating does not activate for direct thermal imaging until an applied heat of approximately 220 degrees Fahrenheit is reached at which time direct thermal imaging on the frontside of the first portion of the substrate is activated.

16. The label of claim 12, wherein the first side of the liner is adhered to a backside of the substrate.

17. A roll of labels, comprising:

a web of media that comprises a substrate aligned and adhered to a liner; the liner having a first side and a second side, and the substrate having a frontside and a backside;

a thermal print coating for direct thermal printing on the frontside of the substrate;

an aqueous resin-based thermal transfer receptive coating on the second side of the liner;

the aqueous resin-based thermal transfer receptive coating is a resin dissolved in ammonia and an alkaline mixture that includes comprises a wax; and perforation die cuts that define a first portion the substrate and a liner portion of the liner, each perforation die cut defining a label-liner combination enabled to be removed from remaining portions of the substrate and the liner.

18. The roll of labels of claim 17, wherein the aqueous resin-based thermal transfer receptive coating is calendared, hardened, and smoothed on the second of the liner.

* * * * *